United States Patent [19]

Zaccaron

[11] Patent Number: 4,565,280

[45] Date of Patent: Jan. 21, 1986

[54] BUCKET CONVEYOR

[76] Inventor: Luigi Zaccaron, Via dei Colli, 2, 33030 Moruzzo (UD), Italy

[21] Appl. No.: 504,175

[22] Filed: Jun. 14, 1983

[51] Int. Cl.[4] ............................................ B65G 41/00

[52] U.S. Cl. .................................... 198/509; 198/519

[58] Field of Search ............... 198/509, 308, 709, 813, 198/816, 511, 815, 519, 520; 414/133, 143, 144

[56] References Cited

U.S. PATENT DOCUMENTS

| | | | |
|---|---|---|---|
| 681,142 | 8/1901 | Seitz | 198/509 X |
| 862,874 | 8/1907 | Beach | 198/509 |
| 1,100,897 | 6/1914 | Makowski | 198/519 |
| 1,460,172 | 6/1923 | Nelson | 198/519 |
| 3,326,355 | 6/1967 | Phillips | 198/815 |
| 3,756,369 | 9/1973 | Hulette et al. | 198/511 |
| 4,363,396 | 12/1982 | Wolf et al. | 414/133 |
| 4,417,652 | 11/1983 | Grandmenil | 198/519 |

FOREIGN PATENT DOCUMENTS

| | | | |
|---|---|---|---|
| 368156 | 3/1973 | U.S.S.R. | 414/133 |

*Primary Examiner*—Robert J. Spar
*Assistant Examiner*—Kyle E. Shane
*Attorney, Agent, or Firm*—Stevens, Davis, Miller & Mosher

[57] ABSTRACT

Bucket conveyor to load heaped materials from a plane on which the heap lies onto another higher plane, comprising lengths of chain, junction links and buckets to carry aggregate, and a framework consisting of a substantially triangular metallic structure bearing two pairs of pulleys, and of a metallic boom or extension which bears at its free end a pair of pulleys farthest from the zone of discharge of the buckets, and whereby the triangular structure and extension forming the framework of the bucket conveyor are connected together at one end with a hinge having its axis perpendicular to the plane which contains the framework.

4 Claims, 5 Drawing Figures

10
11
12
13
14
15
16
17
18
19
20
21
22
23
24
25
26
27
28
29
30
31
32
33
34
125
130
134
A
B

BUCKET CONVEYOR

This invention relates to a bucket conveyor. As is known, by bucket conveyor is meant an apparatus to take heaped materials from a plane on which the heap lies onto another plane higher than the first one.

Such apparatus is employed mainly to load aggregate onto a weighing scale in plants producing concrete.

When seen from above, the apparatus has one end (where the buckets discharge) hinged along a substantially vertical axis to the structure of the weighing scale or to another means whereinto the material carried by the buckets is discharged, the other end being free to move in such a way that the bucket conveyor covers an area corresponding to a circular sector.

As is known, the apparatus consists of a framework having a metallic structure, of three pairs of pulleys of which two pairs are transmission pairs and the third pair is a motive pair, and of a catenary comprising buckets, lengths of chain and junction links that connect the buckets together.

The lengths of chain arranged in two parallel rows with the junction links and with the buckets connected by means of the links form a closed line known as a catenary.

The catenary is borne and runs on the three pairs of pulleys and is actuated by the pair of motive pulleys.

The three pairs of pulleys lie at the vertices of a hypothetical triangle enfolded on its outside by the catenary, of which each chain rests in the circumferential grooves of the relative pulleys.

So as to optimize the output of modern plants producing concrete, it is possible amongst other things to shorten the times for loading the aggregate by increasing the sizes of the buckets of the bucket conveyor.

It is hard to be able to improve the other parameters which affect the loading times, that is, the speed and linear density of the buckets.

Another factor which affects the output of a concrete mixing plant, even though only indirectly, is the quantity of the stock of aggregate which can be used beside each bucket conveyor, since a scanty stock of aggregate entails frequent stoppages of the concrete mixing plant owing to the need to build up the stock again, and the overall total of the stoppages of several bucket conveyors leads to lower output of the plant.

It is possible to increase the quantity of aggregate stored at the side of a bucket conveyor by increasing the length of the bucket conveyor itself so that the bucket conveyor, while being moved, covers an area of stored aggregate corresponding to a much greater circular sector of surface.

An increase in the carrying capacity of the buckets and an increase in the length of the bucket conveyor, however, entail great technical problems as regards the stresses and vibrations which are undergone by the framework and by the apparatus which supports it, for the framework is fitted cantilever-wise with anchorage pins to the apparatus receiving the aggregate, as is known.

Another technical problem which is involved with existing bucket conveyors in the present state of the art concerns the right tensioning of the catenary.

When working begins, the tensioning of the catenary is suitable. The work of a bucket conveyor leads to lengthening of the catenary through wear owing to friction between the links, abrasion by the materials loaded and the tension of the loading action itself.

As the mutual positions of the three pairs of pulleys are set, the lengthening of the catenary lessens the original tension of the catenary until loading work may become impossible or can only take place with difficulty or even until the catenary leaves the pulleys which have been holding it.

It therefore becomes necessary to restore the starting tensioning by taking up the increases in length which have been created.

To this end the known system arranges to act on tensioning screws which are solidly fixed to the framework of the bucket conveyor and which thrust with their threaded end against transmissions solidly fixed to the axle of the pulleys positioned at a vertex of the hypothetical triangle, the vertex being the one farthest from the zone of discharge of the buckets, these pulleys being called the tail pulleys and being moved forwards so as to bring about a greater perimeter of the triangle.

This system entails some problems, such as when it is timely to tension the catenary: when defective working of the catenary is caused: when irregular wear is caused on the pulleys, chains and buckets: when the catenary is caused to leave the pulleys, these being happenings which can take place only through the simultaneous existence of factors such as extreme wear of the chain and pulleys and also asymmetrical tensioning of the catenary.

The object of this invention is to provide a bucket conveyor which overcomes the foregoing technical problems and retains advantageously a limited weight and simplicity of construction.

The invention is embodied with a bucket conveyor to load aggregate which has a framework revolvably anchored at one end along a vertical axis to an apparatus which receives aggregate; three pairs of pulleys of which two are transmission pairs and the third is a motive pair, the three pairs being positioned at vertices of a triangle; a catenary consisting of lengths of chain, junction links and buckets to carry aggregate, the catenary enfolding the three pairs of pulleys. The framework of the bucket conveyor consists of a substantially triangular metallic structure bearing two pairs of pulleys, and of a metallic boom or extension which consists of tubular elements connected together with flanges and which bears the pair of pulleys farthest from the zone of discharge of the buckets, and whereby the triangular structure and the extension forming the framework of the bucket conveyor are connected together with a hinge having its axis perpendicular to the plane which contains the framework, so that the extension is supported by the catenary and can rotate in that plane, thus keeping constant the tension of the catenary when the length of the catenary alters.

Moreover, according to the invention the foregoing hinge absorbs at least partly the vibrations generated in the extension and transmits advantageously to the rest of the framework a force substantially on the same axis as the extension.

Given the same stresses being undergone by the bucket conveyor, the overall structure of the framework can therefore be lightened and simplified.

Other details and features of the invention will stand out from the description given below by way of nonlimitative example and with reference to the accompanying drawings, in which:

FIG. 1 shows a diagrammatic side view of the bucket conveyor of the invention;

FIG. 2 gives a side view, in a smaller scale, of the bucket conveyor of the invention fitted to an apparatus able to receive aggregate;

Figures 1, 2, 3, 4, 5:
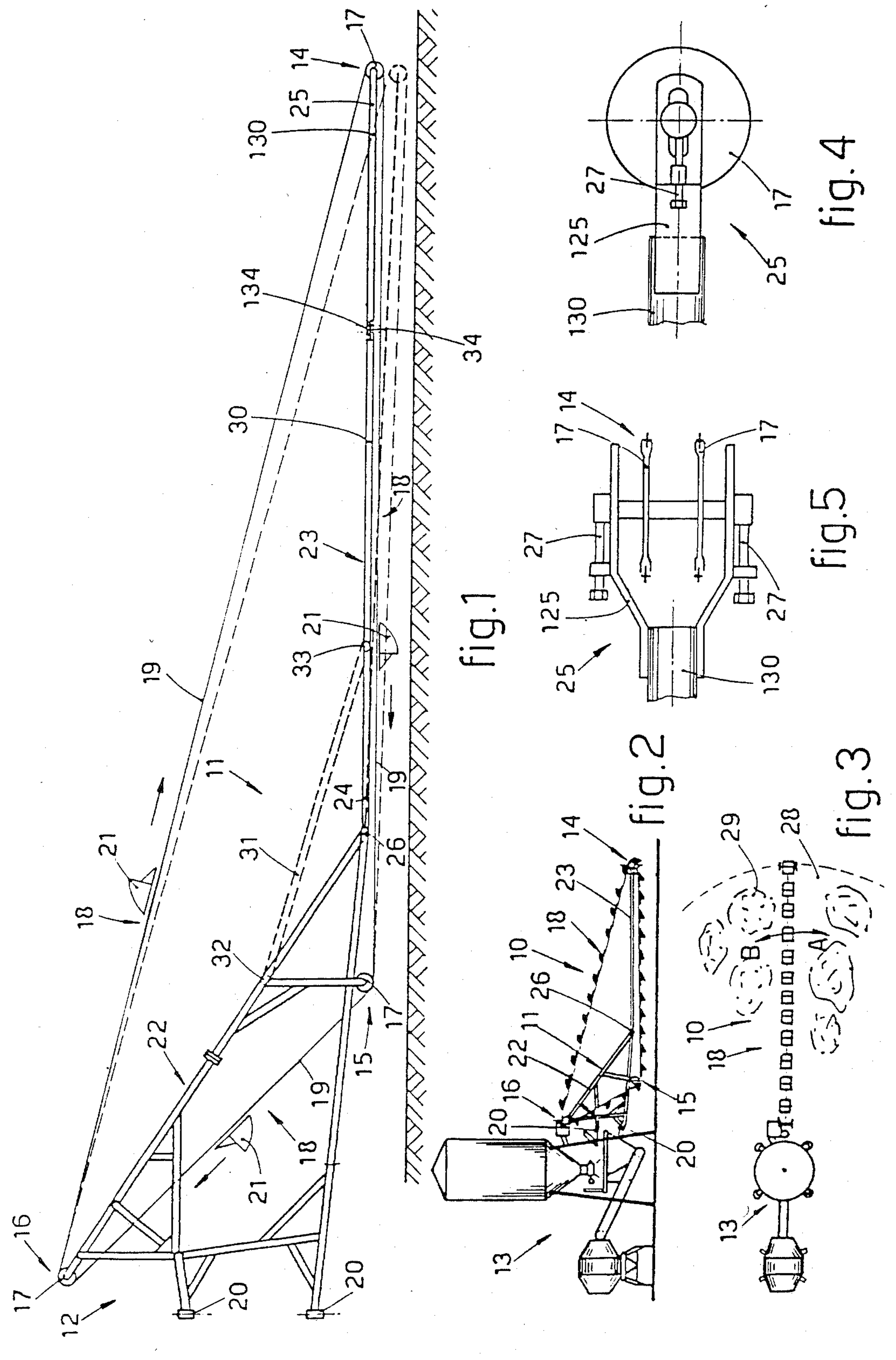
FIG. 3 shows from above the elements of FIG. 2, wherein the two arrows beside the bucket conveyor indicate the movement of the bucket conveyor for loading the various heaps of aggregate.
FIG. 4 shows a side view of the tail pulleys with the screws acting on the tail pulleys.

FIG. 5 gives a view from above of the means shown in FIG. 4.

In the figures a bucket conveyor 10 according to the invention has:—a framework 11 revolvably anchored at one end 12 along a vertical axis, by mans of two anchorage pivots 20, to an apparatus 13 which receives the aggregate: three pairs 14,15,16 of pulleys 17 two of which are transmission pairs 14,15 while one 16 is a motive pair, the three pairs being located at the vertices of a triangle: and a catenary 18 consisting of lengths of chain 19, junction links and buckets 21 to carry aggregate, the three pairs of pulleys 17 being enfolded by the catenary 18.

According to the invention the framework 11 consists of a substantially triangular metallic structure 22 bearing two pairs 15 and 16 of pulleys 17, and of a metallic boom or extension 23 bearing the pair 14 of pulleys 17 which is farthest from the zone of unloading of the aggregate.

According to the invention an end 24 of the horizontal part of the framework 11 opposite end 25 is connected to the remainder 22 of the triangular structure of the framework 11 by means of a hinge 26 having a horizontal axis at right angles to the axis of the extension 23.

The extension 23 consists of two successive tubular elements 30,130 connected together with flanges. To be more exact, the horizontal extension 23 between the hinge 26 and the tail pulleys 14 consists of an element 30 made with two parallel tubes side by side horizontally, which has at one end the holes for the hinge 26 and at its other end a flat horizontal flange 34, and of one single tubular element 130 which has at one end a flange 134 connected to the preceding flange 34 and at its other end the pair 14 of tail pulleys 17 borne by a fork 125.

The element 30 connected to the hinge 26 has a variable length depending on the length of the bucket conveyor, whereas the element 130 bearing the pair 14 of tail pulleys 17 always has the same length.

This also facilitates transport and assembly operations considerably and enables the length of the bucket conveyor 10 to be varied readily to suit the specific requirements of the usage means being served.

The vertical distance between the anchorage pivots 20 which connect the bucket conveyor 10 to the apparatus 13 receiving the aggregate is increased to 120 cms. so as to reduce stresses on the apparatus 13 and on the framework 11 of the bucket conveyor 10.

Screws 27 which act on the tail pulleys 17 govern not the tension of the catenary 18 but the slope of the extension 23, which can rotate around the hinge 26 in a vertical plane and interacts advantageously with the catenary 18 by means of the tail pulleys 17, thus supporting the catenary 18 and at the same time being supported by the catenary 18. It is therefore the extension 23 which determines the tension of the catenary 18 by its own weight.

When work begins, the extension 23 is in a horizontal position and the catenary 18 is suitably tensioned. To this end the machine operator can act on the length of the catenary 18 during assembly of the bucket conveyor 10 by adding or removing links of chain 19 and also on the extension 23 with possible ballasting weights and also on the screws 27 so as to arrange advantageously the horizontal positioning of the extension 23 and the tension of the catenary 18.

By acting on the screws 27 it is possible to move the tail pulleys 17 forwards or backwards and therefore to raise or lower the end 25 of the extension 23 in relation to the hinge 26.

When the catenary 18 becomes lengthened, the tail pulleys 17 and the extension 23 are lowered, thus taking up the lengthening and keeping the tension of the catenary 18 constant.

To this end a gap is maintained between a bucket 21 which is beginning its horizontal run an extension 23 and the ground. This gap will consist of some centimeters.

Thus from its horizontal position, so long as a bucket 21 does not scrape the ground, the catenary has a constant tension without any need for action by the machine operator.

When a bucket 21 touches or is lowered near to the ground, this being a position which can be readily seen, the machine operator will act on the screws 27, to move forward the pulleys 17, which interact with the catenary 18 and cause the raising of the extension 23 and the return to the starting conditions.

When the screws 27 reach the end of their travel, the machine operator will reduce the length of the catenary 18 by removing one or more links of chain and thereafter act, on the screws 27 until the conditions at the beginning of working have been restored.

For special conditions of working of the bucket conveyor 10 it is possible to apply between the triangular structure 22 and the extension 23 of the framework 11 of the bucket conveyor 10 a tubular screw shackle 31 pivoting at one end 32 on the longer side of the triangular structure 22 and at its other end 33 on the middle tracts of the extension 23 so as to hinder rotation of the extension 23 itself.

In any event the interposition of the hinge 26 prevents almost wholly the transmission of the bending moment and of strong vibrations of the extension 23 to the triangular structure 22 and reduces the state of stress.

This enables the length of the bucket conveyor 10 to be increased to more than 12 meters without any great problems and therefore allows an increase of the area of the circular sector 28 employed for the storage of heaps 29 of aggregate to be loaded by the bucket conveyor 10 during its full traversing movement shown by arrows A and B in FIG. 3. It also makes possible the reduction of the frequency of stoppages of the concrete mixing plant owing to the need for building up again the stock of aggregate, for the overall total of the stoppages of the various bucket conveyors serving a plant has an adverse effect on the output of the plant.

A preferred embodiment of the invention, has been described but variants are possible for a person skilled in this field without departing thereby from the scope of the invention.

I claim:

1. Bucket conveyor to load heaped aggregate materials from a plane on which the heap lies onto another higher plane, comprising a framework revolvably anchorable at one end along a vertical axis to an apparatus which receives aggregate, consisting of a substantially triangular metallic structure bearing two pairs of pulleys and of a metallic boom or extension which bears at a free end a pair of pulleys farthest from the zone of discharge of the buckets, said triangular structure and extension being connected together at one end with a hinge having its axis perpendicular to a plane which contains the framework, said hinge being positioned between said pulleys on said extension and on said triangular structure; a length of chain; junction links and buckets positioned on said chains around said pairs of pulleys, said chain forming a catenary between two pairs of pulleys further including screws wherein the height of the free end of the extension and of the pair of pulleys solidly fixed to that end above the ground can be adjusted with said screws to move the pair of pulleys lengthwise in relation to the extension.

2. The bucket conveyor as claimed in claim 1, wherein said extension can rotate around the hinge interposed between the triangular structure and the extension, thus keeping the tension of the catenary substantially constant when the length of the catenary varies.

3. The bucket conveyor as claimed in claim 1, including a tubular screw shackle positioned between the triangular structure and extension of the framework said tubular screw shackle pivoting at one end on a side of the triangular structure and at its other end on the middle tract of the extention.

4. The bucket conveyor as claimed in claim 1, wherein the extension consists of two tubular elements connected together with flanges, of which one element consists of two parallel tubes placed side by side horizontally and having holes at one end for the hinge and a flange at their other end, whereas the other element consists of only one tubular element having at one end a flange connected to the foregoing flange and at its other end the pair of tail pulleys.

* * * * *